May 27, 1924.

P. GAETANO

CHEESE GRATER

Filed Feb. 16, 1924

Pampinella Gaetano,
Inventor,
By Charles Turner Brown,
Atty.

May 27, 1924.
P. GAETANO
CHEESE GRATER
Filed Feb. 16, 1924
1,495,386
2 Sheets-Sheet 2
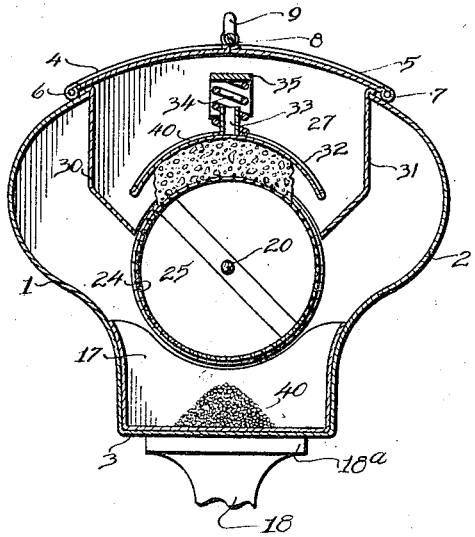
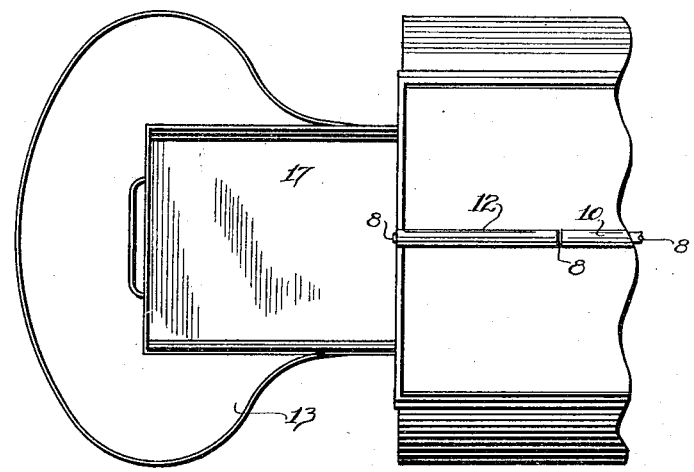
Pampinella Gaetano,
Inventor,
By Charles Turner Brown,
Atty.

Patented May 27, 1924.

1,495,386

UNITED STATES PATENT OFFICE.

PAMPINELLA GAETANO, OF CHICAGO, ILLINOIS.

CHEESE GRATER.

Application filed February 16, 1924. Serial No. 693,256.

*To all whom it may concern:*

Be it known that I, PAMPINELLA GAETANO, a subject of the King of Italy, and a resident of Chicago, in the county of Cook and State of Illinois, have invented certain new and useful Improvements in Cheese Graters, of which the following, when taken in connection with the drawings accompanying and forming a part hereof, is a specification.

This invention relates to a device for grating cheese to be used in cooking macaroni, spaghetti, and the like.

Among the objects of the invention is to obtain a cheese grater which is simple in construction, effective in operation, durable, and not liable to become broken or to get out of order; and which may be used at intervals, and the cheese which is to be grated may be left therein without becoming deteriorated in flavor or otherwise.

Additional objects are set forth in the claims which specifically recite the invention embodied in the device illustrated.

In the drawings referred to Fig. 1 is a top plan view of a cheese grater embodying the invention, with the doors forming the cover thereof open, to expose the operative parts of the device to view.

Fig. 3 is a vertical transverse section of the cheese grater, on line 3—3 of Fig. 2, viewed in the direction indicated by arrows.

And

Figures 1, 2:
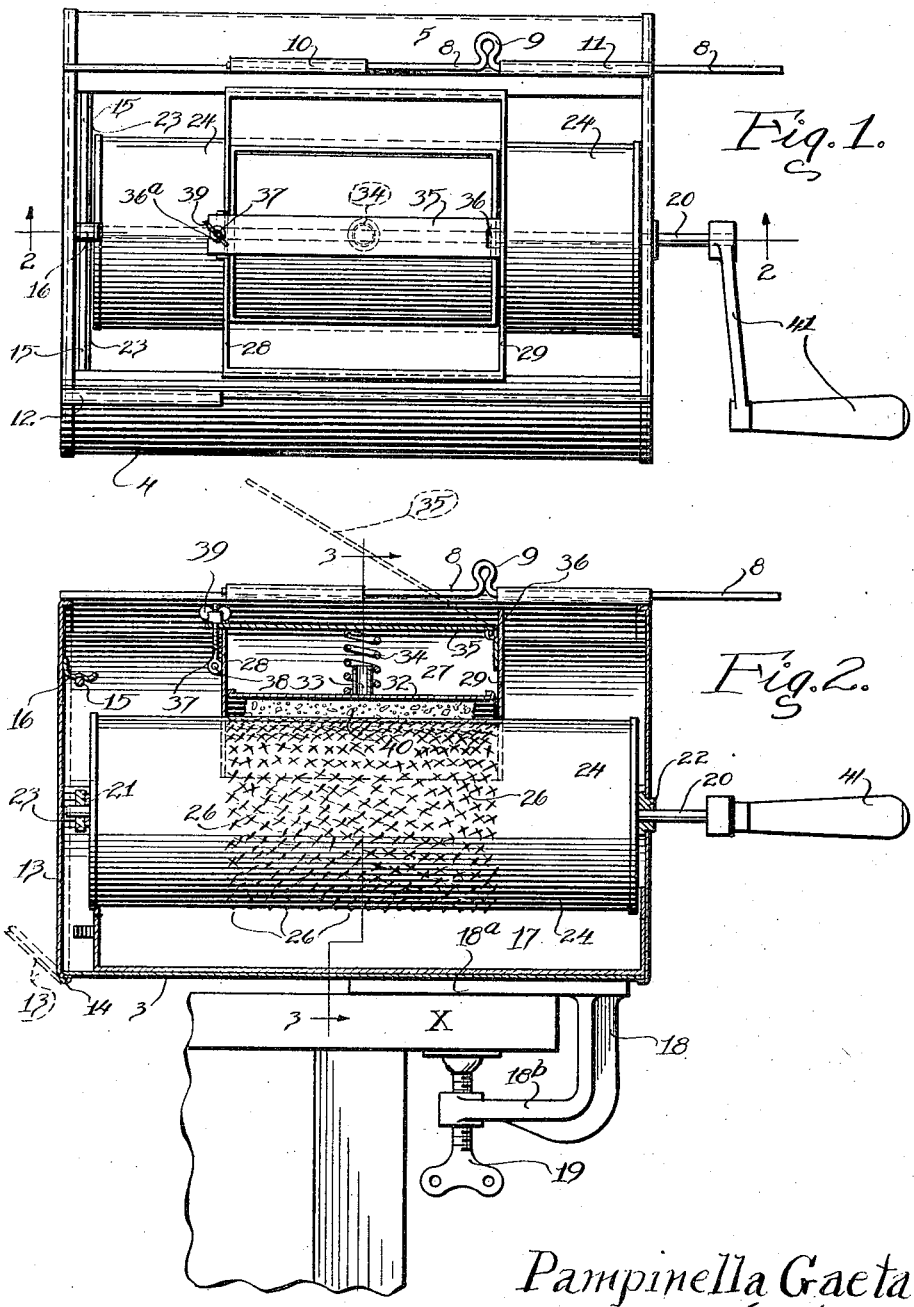
Fig. 2 is a vertical longitudinal section of the cheese grater, on line 2—2 of Fig. 1, viewed in the direction indicated by arrows.

Fig. 4 is a top plan view of one end of the cheese grater, with an end door opened into a substantially horizontal plane, with a drawer which forms an element of the device partially withdrawn from the body of the device.

A reference character applied to designate a given part indicates said part throughout the several figures of the drawing, wherever the same appears.

1, 2, respectively represent the sides of the shell or case of the device. 3 represents the bottom of the shell or case, and 4, 5, doors which are pivotally mounted on pintles 6, 7, respectively. 8 represents a longitudinally movable wire which is provided with bends forming an abutment, (9), by means of which the wire may be moved longitudinally in the guide ways 10, 11, on door 5; and 12 represents a guide way for wire 8, on door 4. When the doors 4, 5, are closed and the wire 8 is moved toward the left, as viewed in Figs. 1 and 2, the left hand end thereof is moved into guide way 12, as is illustrated in Fig. 4, and the doors are thereby locked in a closed position. 13 represents a door which is pivotally mounted on one end of bottom 3, on wire 14. 15 represents a rod which extends from side 1 to side 2, to which sides it is rigidly secured. 16 represents a latch which yieldingly engages with rod 15, to hold the door 13 in a closed position. 17 represents a drawer which is contained in the shell or case of the device, and which when the door 13 is in a substantially horizontal plane, may be moved longitudinally, and removed from the shell or case. 18 represents a clamp, which is provided with members 18$^a$, 18$^b$. The member 18$^a$ of the clamp is rigidly secured to the bottom 3 of the shell or case, as by solder or fusible alloy of like character: and the member 18$^b$ of the clamp is provided with the screw threaded bolt 19. The screw threads on said bolt 19 fit corresponding screw threads in said member 18$^b$. By means of this clamp the device is attachable to a table, as X, Fig. 2. 20 represents a shaft which is rotatably mounted in journal bearings 21, 22. Journal bearing 21 is mounted on cross bar 23, which extends from side 1 to side 2, (see Figs. 1 and 2), of the shell or case, and is rigidly secured thereto at its ends. Journal bearing 22 is mounted in one end of the shell or case. 24 represents a cylinder, which is preferably open at its ends, and is rigidly secured to shaft 20, by bars. These bars are positioned at the ends of cylinder 24 and rigidly secured thereto, and are duplicates, one thereof being illustrated in Fig. 3, and designated by the character 25. They are, respectively, provided intermediate the ends thereof, with an aperture in which shaft 20 fits closely, and to which said bars are rigidly secured, as by solder or other fusible alloy. The central portion of cylinder 24 is provided with the punched out apertures 26, 26; which extend over so much of said cylinder as forms a bottom to the hereinafter described inner chamber in the shell or case. These apertures are made in the ordinary way of making apertures in sheet metal graters to obtain raised cutting or grating edges thereto.

The shell or case is provided with an inner chamber (27), which is open at the bottom, and when the doors 4, 5 are opened, is also open at the top or upper end thereof. This inner chamber 27 is obtained by means of the end walls 28, 29 and the side walls 30, 31. The end walls 28, 29, are curved at the lower edges thereof to correspond with the curve of cylinder 24, and are near to said cylinder. The side walls 30, 31, extend inward at the lower portions thereof; and are also extended to near the cylinder 24. 32 represents a curved plate, and 33 a lug on plate 32. Lug 33 is illustrated in Figs. 2 and 3 as tubular. 34 represents a spring the lower end of which fits over the lug 33. 35 represents a bar which is pivotally connected at one end thereof by hinge 36, (Figs. 1 and 2), to end wall 29 of the chamber 27. The opposite end of bar 35 is provided with a notch, 36ª. 37 represents a screw threaded bolt which is pivotally mounted at its lower end, by means of pin 38 to end wall 28, of chamber 27; and at its upper end is provided with thumb nut 39, having internal screw threads corresponding with the screw threads on bolt 37, (see Figs. 1 and 2). When bar 35 is in a substantially horizontal plane and the bolt 37 is in a substantially vertical plane, said bolt is in the notch hereinbefore referred to in one end of the bar 35; and by turning thumb nut 39 down onto said bar it is thereby held in the substantially horizontal plane. At said time the upper end of spring 34 abuts against the under side of said bar 35, and thereby the curved plate 32 is yieldingly forced downward towards the cylinder 24, and on to material, as cheese 40, (Fig. 2), interposed between said curved plate and said cylinder. Thereupon by rotation of shaft 20, by means of crank or handle 41, cheese 40 is grated, and the particles therefrom drop into drawer 17, as is illustrated in Fig. 3. When a sufficient quantity of cheese has been grated the door 13 is moved from its substantially vertical position, as illustrated in Figs. 1 and 2, into a substantially horizontal position, as illustrated in Fig. 4; whereupon the drawer 17 is removed from the shell or case and the grated cheese is taken from said drawer. The drawer is then replaced in the shell or case and the door 13 returned to its closed position. At this time the ungrated cheese between the upper face of cylinder 24 and the under face of curved plate 32 is retained in its position, so that additional quantities thereof may be grated therefrom upon the turning of the crank or handle 41, as hereinbefore recited; and in the meantime the shell or case being closed, the flavor of the cheese is retained.

When additional cheese is required in chamber 27, the thumb nut 39 is loosened, and bolt 37 is turned on pivot 38 out of the notch in one end of bar 35, and said bar turned on pin 36, say into substantially the position indicated by broken lines 35, Fig. 2; and spring 34, together with curved plate 32 removed from said chamber 27. Thereupon an additional piece of cheese is placed on the cylinder 24, the curved plate 32 and spring 34 is replaced and the bar 35 forced downward on said spring, into a substantially horizontal plane. The bolt 37 is turned into the notch at one end of bar 35, and thumb nut 39 turned down onto said bar.

I claim;

1. In a cheese grater, a shell open at one end and on the upper side thereof, a bar extending across the open end of said shell, doors pivotally attached to said shell and adapted to close the open end and the upper side of said shell, respectively, in combination with a rotatable shaft journalled in the closed end of the shell and in said bar, means to rotate said shaft, a cylinder provided with apertures having raised edges thereto rigidly mounted on said shaft, a removable receptacle in said shell and underneath said cylinder, and means to yieldingly force material on said cylinder against the raised edges of said apertures.

2. In a cheese grater, a shell open at one end and on the upper side thereof, a bar extending across the open end of said shell, doors pivotally attached to said shell and adapted to close the open end and the upper side of said shell, respectively, in combination with a rotatable shaft journalled in the closed end of the shell and in said bar, means to rotate said shaft, a cylinder open at its ends and provided in the cylindrical wall thereof with apertures having raised edges thereto, bars extending across the open ends of said cylinder, said bars rigidly mounted intermediate their ends on said shaft, a removable receptacle in said shell and underneath said cylinder, and means to yieldingly force material on said cylinder against the raised edges of said apertures.

3. In a cheese grater, a shell open at one end and on the upper side thereof, a bar extending across the open end of said shell, doors pivotally attached to said shell and adapted to close the open end and the upper side of said shell, respectively, a plurality of walls in said shell arranged to obtain a chamber open at the top and bottom thereof, in combination with a rotatable shaft journalled in the closed end of the shell and in said bar, means to rotate said shaft, a cylinder provided with apertures having raised edges thereto rigidly mounted on said shaft, the portion of said cylinder which is provided with said apertures arranged to close the open bottom of said chamber, and means to yieldingly force material in said chamber on to said cylinder and against the raised edges of said apertures.

4. In a cheese grater, a shell, open at one end and on the upper side thereof, a bar extending across the open end of said shell, doors pivotally attached to said shell and adapted to close the open end and the upper side of said shell respectively, in combination with a plurality of walls in said shell arranged to obtain a chamber open at the top and bottom thereof, a bar pivotally attached to one of the walls of said chamber and extending to the wall opposite thereto, and a bolt pivotally attached to said opposite wall and arranged to co-act with said bar to retain said bar in a determined position, a curved plate in said chamber, and a spring interposed between said curved plate and said bar.

5. In a cheese grater, a shell open at one end and on the upper side thereof, a bar extending across the open end of said shell, doors pivotally attached to said shell and adapted to close the open end and the upper side of said shell, respectively, a plurality of walls in said shell arranged to obtain a chamber open at the top and bottom thereof, a bar pivotally attached to one of the walls of said chamber and extending to the wall opposite thereto, and a bolt pivotally attached to said opposite wall and arranged to co-act with said bar to retain said bar in a determined position, a curved plate in said chamber, and a spring interposed between said curved plate and said bar, in combination with a rotatable shaft journalled in the closed end of the shell and in said bar, means to rotate said shaft, a cylinder provided with apertures having raised edges thereto rigidly mounted on said shaft, the portion of said cylinder which is provided with said apertures arranged to close the open bottom of said chamber.

PAMPINELLA GAETANO.

Witnesses:
EDMUND J. RICE,
JOSEPHINE EVERS.